United States Patent
Carlson (10) Patent No.: US 11,986,838 B2
(45) Date of Patent: *May 21, 2024

(54) COMPOSITION AND METHOD FOR TREATING AND REMEDIATING AQUEOUS WASTE STREAMS

(71) Applicant: Tygrus, LLC, Troy, MI (US)

(72) Inventor: Lawrence Carlson, North Branch, MI (US)

(73) Assignee: Tygrus, LLC, Troy, MI (US)

( * ) Notice: Subject to any disclaimer, the term of this patent is extended or adjusted under 35 U.S.C. 154(b) by 84 days.

This patent is subject to a terminal disclaimer.

(21) Appl. No.: 17/521,326

(22) Filed: Nov. 8, 2021

(65) Prior Publication Data
US 2022/0055041 A1  Feb. 24, 2022

Related U.S. Application Data

(63) Continuation of application No. 16/843,966, filed on Apr. 9, 2020, now Pat. No. 11,167,290, which is a
(Continued)

(51) Int. Cl.
*B03C 1/30* (2006.01)
*C02F 1/00* (2023.01)
(Continued)

(52) U.S. Cl.
CPC ............... *B03C 1/30* (2013.01); *C02F 1/467* (2013.01); *C02F 1/4672* (2013.01); *C02F 1/48* (2013.01);
(Continued)

(58) Field of Classification Search
CPC .. B03C 1/30; C02F 1/001; C02F 1/463; C02F 1/467; C02F 1/4672; C02F 1/48;
(Continued)

(56) References Cited

U.S. PATENT DOCUMENTS 5,304,302 A   4/1994 Bossert
5,380,430 A   1/1995 Overton et al.
(Continued)

FOREIGN PATENT DOCUMENTS

CN   101610679 A   12/2009
JP   S51-049553 A   4/1976
(Continued)

OTHER PUBLICATIONS

Rudnev Stanislav Vasil Evich et al, RU 2476804, Machine translation, pp. 1-29 (Year: 2012).*

(Continued)

*Primary Examiner* — Claire A Norris
(74) *Attorney, Agent, or Firm* — Young Basile Hanlon & MacFarlane, P.C.

(57) ABSTRACT

An apparatus for treating a stream of contaminated water having an elevated concentration of at least one of light metals, heavy metals, sulfates that includes at least one process fluid inlet communicating with a process conduit; at least one electrode reaction vessel in fluid communication with the process conduit, the reaction vessel having an interior chamber and at least one electrode positioned in the reaction chamber, the electrode powered by a alternating current source; and at least one magnetic field reaction vessel in fluid communication with the process conduit, the magnetic field reaction vessel having an outwardly oriented surface and an opposed inwardly oriented surface, the magnetic field reaction vessel having at least one magnet in contact with the inwardly oriented surface of the magnetic field reaction vessel.

16 Claims, 2 Drawing Sheets

Related U.S. Application Data continuation of application No. 15/632,935, filed on Jun. 26, 2017, now Pat. No. 10,618,057.

(60) Provisional application No. 62/354,556, filed on Jun. 24, 2016.

(51) Int. Cl.
*C02F 1/467* (2023.01)
*C02F 1/48* (2023.01)
*C02F 1/66* (2023.01)
*C02F 101/10* (2006.01)
*C02F 101/20* (2006.01)
*C02F 101/34* (2006.01)
*C02F 101/36* (2006.01)
*C02F 103/00* (2006.01)
*C02F 103/10* (2006.01)

(52) U.S. Cl.
CPC ............ *C02F 1/001* (2013.01); *C02F 1/66* (2013.01); *C02F 2101/101* (2013.01); *C02F 2101/20* (2013.01); *C02F 2101/203* (2013.01); *C02F 2101/206* (2013.01); *C02F 2101/34* (2013.01); *C02F 2101/36* (2013.01); *C02F 2103/001* (2013.01); *C02F 2103/10* (2013.01); *C02F 2201/4613* (2013.01); *C02F 2201/46135* (2013.01); *C02F 2201/46175* (2013.01); *C02F 2201/48* (2013.01)

(58) Field of Classification Search
CPC .. C02F 1/5236; C02F 1/66; C02F 1/70; C02F 2101/101; C02F 2101/20; C02F 2101/203; C02F 2101/206; C02F 2101/34; C02F 2101/36; C02F 2103/001; C02F 2103/10; C02F 2201/4613; C02F 2201/46135; C02F 2201/46175; C02F 2201/48; C02F 2305/00
USPC ........................................................ 210/222
See application file for complete search history.

(56) References Cited

U.S. PATENT DOCUMENTS

| | | | |
|---|---|---|---|
| 5,698,107 | A | 12/1997 | Wurzburger et al. |
| 6,096,222 | A | 8/2000 | Wurzburger et al. |
| 7,513,987 | B1 | 4/2009 | Wurzbarger |
| 10,618,057 | B2 * | 4/2020 | Carlson ............... C02F 1/463 |
| 11,167,290 | B2 * | 11/2021 | Carlson ............... C02F 1/463 |
| 2015/0352561 | A1 | 12/2015 | Holland |
| 2016/0312093 | A1 | 10/2016 | Carlson et al. |
| 2017/0368556 | A1 | 12/2017 | Carlson |

FOREIGN PATENT DOCUMENTS

| | | |
|---|---|---|
| JP | 2003-251359 A | 9/2003 |
| KR | 10-2005-0025262 A | 3/2005 |
| RU | 2091321 C1 | 9/1997 |
| RU | 2174959 C1 | 10/2001 |
| RU | 2284966 C2 | 10/2006 |
| RU | 2476804 C2 | 2/2013 |
| WO | 1998/05595 A1 | 2/1998 |

OTHER PUBLICATIONS

International Search Report and Written Opinion for international application No. PCT/US2017/039241; dated Oct. 5, 2017; ISA/RU; 7 pages.

Rudnev Stanislav Vasil Evich et al, RU 2476804, Machine translation, pp. 1-9 (Year: 2012).

Chang-Geng Ding, et al., "Partially and Fully Deprotonated Sulfuric Acid", Chemical Physics Letters, vol. 390, No. 4-6, Apr. 30, 2004, pp. 307-313.

Orkid Coskuner, et al. "Water Dissociation in the Presence of Metal Ions" Angewandte Chemie, vol. 119, No. 41, Oct. 15, 2007, pp. 7999-8001.

* cited by examiner

COMPOSITION AND METHOD FOR TREATING AND REMEDIATING AQUEOUS WASTE STREAMS

The present application is a continuation of U.S. non-provisional patent application Ser. No. 16/843,966 filed Apr. 9, 2020 currently pending, which is a continuation of U.S. non-provisional patent application Ser. No. 15/632,935 filed Jun. 26, 2017 which has issued as U.S. Pat. No. 10,618,053 and which claims priority to U.S. provisional application No. 62/354,556 filed Jun. 24, 2016, the disclosures of which are both incorporated by reference herein.

BACKGROUND

The present invention pertains to methods and composition for treating waste and effluent waters originating from sources including but not limited to manufacturing as well as excavation and mining operations.

Many times, water effluent is a necessary product of manufacturing and mining operations. The water effluent produced can include one or more trace compounds that are dissolved or suspended in the process stream. Many of these trace compounds that are entrained in the process stream can have deleterious or adverse effects if discharged into the surrounding environment. Discharge of many such compounds is regulated by various state, local and federal environmental agencies.

In operations such as mineral and energy extraction, copious amounts of water can sometimes be employed in various processes and sub processes. Typically, this water must be processed prior to discharge to reduce or eliminate process contaminants. In certain situations, such as mineral extraction operations, the extraction sites themselves, whether active or inactive, provide a generation source as water from rain, storm water runoff and aquifer leaching carries various contaminants away from the original extraction site into the surrounding environment. In mining operations, this is generally referred to as Acid Mine Drainage (AMD) or acid rock drainage. Acid mine drainage results from oxidation of metal sulfide minerals such as pyrites and other ores. The various extraction sites can produce effluent that has elevated levels of one or more of the following metal contaminants, sulfur-containing compounds, volatile and dissolved organics. These contaminants can exist in either dissolved or suspended for and can be present as ions or as compounds such as higher oxidation state compounds.

Metal contaminants and metal compounds can include heavy metals and/or light metals. Heavy metals include, but are not limited to, iron, copper, zinc, magnesium, manganese, aluminum, cadmium, nickel and lead, selenium, mercury, cobalt and the like. Sulphur containing compounds include various sulfates, sulfides, and sulfites. Additionally, the water material can contain various cyanides, cyanates and the like.

Past efforts have been directed to processes that can treat moderate to high concentrations of dissolved metals and sulfates, i.e. levels above about 5000 ppm. In many processes, treatment technology employs a variety of tactics to precipitate metal contaminants and reduce sulfate and cyanate concentration. Unfortunate side effects of such processes include the precipitation of hazardous material as metal hydroxides and calcium sulfate which results in significant disposal costs and necessitates the use of hazardous and/or difficult-to-handle reagents. Additionally, the nature, quality and contaminant panel varies from origination site to origination site, making it difficult to provide remediation process and protocol that is efficient and effective across a variety of locations and situations.

It has been difficult to provide processes that adequately address and remediate the environmental challenges specific to each given generation site. It would be desirable to provide a device and method that can address and mitigate various target compounds at a variety of concentration levels present in the specific effluent material such as material associated with acid mine drainage. It would also be desirable to provide a device and method that can address and mitigate various target compounds at various concentration levels in industrial process streams.

SUMMARY

An apparatus is disclosed for treating a stream of contaminated water that includes at least one process fluid inlet communicating with a process conduit and at least one electrode reaction vessel in fluid communication with the process conduit. The reaction vessel has an interior chamber and at least one electrode positioned in the interior chamber. The electrode is powered by a pulsed electric current source. The apparatus also includes and at least one magnetic field reaction vessel that is in fluid communication with the process conduit. The magnetic field reaction vessel has an outwardly oriented surface and an opposed inwardly oriented surface and has at least one magnet in physical contact with the inwardly oriented surface of the magnetic field reaction vessel. The apparatus is useful for the treatment of an aqueous process stream having an elevated concentration of at least one target contaminant compound or component and can have specific applicability in treatment of process streams in which the target compound component or component includes at least one of light metals, heavy metals, sulfates, cyanides and compounds and complexes thereof.

Also disclosed herein is a process for treating a stream of contaminated water having an elevated concentration of at least one target compound component or component. In certain embodiments, the target compound component can include at least one light metals, heavy metals, sulfates, cyanides, hydrocarbons, substituted hydrocarbons and compounds and complexes thereof. The process includes the step of charging the process stream with a quantity of a compound having the following formula:

$$\left[ H_x O_{\frac{(x-1)}{2}} + (H_2O)_y \right] Z$$

wherein x is an odd integer ≥3, y is an integer between 1 and 20 and Z is a polyatomic ion, with Z being at least one of a Group 14 through 17 monoatomic ion having a charge between −1 and −3 and/or a polyatomic ion having a charge between −1 and −3. The process also includes the step of exposing the process stream to a pulsed electric field and to a focused magnetic field having a value between 10 gauss and 1,000,000 gauss. Exposure of the process stream to the pulsed electric field and the focused magnetic field can occur in any order relative to one another. The steps of exposure and charging can occur in any order relative to one another.

BRIEF DESCRIPTION OF THE DRAWINGS

In the present disclosure reference is made to the following various drawings in which like reference numerals are used for like elements throughout the various figures. The drawing figures are for illustrative purposes only and include the following.

DETAILED DESCRIPTION

Disclosed herein is an apparatus and method for treating a stream of contaminated water. As broadly described, the apparatus includes at least one process fluid inlet that communicates with a source of contaminated water in a manner that permits conveyance of at least a portion of the contaminated water into operative contact with the apparatus. As depicted in in FIGS. 1 and 2, this can be configured as at least one process fluid inlet. The process fluid inlet is configured in a manner that conveys at least a portion of the contaminated water into operative contact with the apparatus. In certain embodiments, the device can be employed to reduce and/or eliminate target contaminants. Non-limiting examples of target chemical contaminant compounds that include at least one of the following: metals, heavy metals, hydrocarbons, substituted hydrocarbons, sulfate compounds and the like.

The device may include at least one electrolytic reaction vessel that is in fluid communication with the at least one process fluid conduit. The electrolytic reaction vessel has an interior chamber and at least one electrode operatively positioned in the reaction chamber that is powered by an alternating current source. The electrolytic reaction vessel can be configured to receive a volume of the process stream material and retain it in the electrolytic reaction vessel for an interval sufficient to permit process fluid exposure and interaction with the at least one electrode for a suitable contact interval. In certain embodiments, the contact interval will be between 2 seconds and 90 minutes.

In certain embodiments, the apparatus can be configured to facilitate continuous through processing of the contaminated water material in a continuous or semi-continuous process flow as desired or required. In certain embodiments, the at least one electrode reaction vessel can be configured with a suitable internal volume to permit process fluid residence sufficient to achieve contact between the contaminated water making up the process fluid and the electrode for an interval between 2 seconds and 90 minutes per 100 gallons of process fluid material. In certain embodiments, the interval can be between 5 seconds and 60 minutes per 100 gallons of process fluid material. In certain embodiments, the contact interval can be between 10 seconds and 30 minutes per 100 gallons of process fluid material; between 20 seconds and 30 minutes per 100 gallons of process fluid material; between 15 seconds and 15 minutes per 100 gallons of process fluid material.

The process fluid is exposed to a pulsed electric field. Exposure can be accomplished by one or more methods including, but not limited to, at least one of the following: varying voltage intensity, varying the voltage delivery duration interval, varying the electrode polarity in at least one electrode that is positioned in the electrolytic reaction vessel. The pulse frequency rate can be between 60 pulses per second to 1 pulse per 10 minutes in certain embodiments. In other embodiments, it is contemplated that the pulse rate can be between 1 pulse per second and 1 pulse per minute, while in other embodiments, it is contemplated that the certain embodiments, the pulse rate can be between 1 pulse per 5 seconds and 1 pulse per minute. In certain embodiments, the pulsed electric field is accomplished by polarity reversal in the electrode.

In certain embodiments, the at least one electrolytic reaction vessel can be configured with at least one electrode. Where desired or required, the electrode can be configured as a bipolar electrode. In certain embodiments, the at least one electrolytic reaction vessel will be configured with at least one pair of electrodes positioned to provide anodic and cathodic exposure to the process fluid that is present in the at least one electrolytic reaction vessel. It is also contemplated the at least one electrode reaction vessel can include a plurality of electrode assemblies if desired or required.

In the apparatus, as disclosed, the at least one electrolytic reaction vessel can be in electronic connection with a suitable control unit and can include suitable regulators, interfaces and the like configured to supply suitable pulsed electric current to the at least one electrode.

The at least one electrode can be configured to alternate or reverse polarity. The at least one electrode can be configured as electrode pair that can be configured to alternate or reverse polarity from anode to cathode in a pulsed or intermittent alternate manner. It is contemplated that polarity of the subject anode can be reversed in an alternating manner. In certain embodiments, the polarity can be reversed in a frequency at least between 60 reversals per second and 1 reversal per 10 minutes. In certain embodiments, the frequency can be between 1 reversal per second and 1 reversal per minute, while in other embodiments, the frequency can be between 1 reversal per 5 seconds and 1 reversal per minute. Without being bound to any theory, it is believed that the reversal in polarity can enhance electrode surface activity and that exposure in the electrolytic reaction vessel can produce an induced charge state in the process fluid stream.

Without being bound to any theory, it is believed that exposure to the electrode(s) promotes at least one electrochemical reaction on or proximate to the electrode surface that catalyzes at least one chemical reaction that breaks one or more bonds existing in compounds present as contaminant(s) in the aqueous process stream rendering the compounds present as contaminants more amenable to subsequent reactive processing. It is believed that the process occurring at or proximate to the electrode surface ionizes compounds present in the associated aqueous material.

The at least one electrode can be composed of any suitable material. In certain embodiments, the electrode can be composed of a conductive material and can be either inert or reactive. Non-limiting examples of inert materials suitable for use as an electrode can include one or more of: carbon, graphite, gold, platinum, rhodium and the like. Non-limiting examples of reactive electrode materials include copper, zinc, lead, silver and the like.

The apparatus may also include at least one magnetic field region reaction vessel in fluid communication with the process fluid conduit. The magnetic field region reaction vessel can be configured to expose the process fluid to a non-polar magnetic field. The magnetic field reaction vessel has an outwardly oriented surface and an opposed inwardly oriented surface with at least one magnet in contact with the inwardly oriented surface of the magnetic field reaction vessel. The magnetic field reaction vessel has at least one magnet that is in contact with the inwardly oriented surface of the magnetic reaction vessel. In certain embodiments, the magnet can be an electromagnet. In certain embodiments, the magnet material can be a rare-earth magnet. Non-limiting examples of suitable rare earth magnets are materials made from alloys of rare earth elements including those of the lanthanide series plus scandium and yttrium. In certain embodiments, such magnets can exert a magnetic field that exceeds 5000 to 10,000 gauss such as a neodynium magnets and sumarium-cobalt magnets.

In various embodiments, the magnetic field generated in the magnetic field region reaction vessel can be configured to provide a focused magnetic field having a magnetic flux value between 10 gauss and 2,000,000 gauss. In certain embodiments, the magnetic field will be between 5000 and 1,000,000 gauss in certain applications and between 5000 and 100,000 gauss. It is to be understood that in certain applications, the magnetic field can be between 10 and 10,000 gauss.

It is contemplated that the process stream can be exposed to the generated magnetic field for an interval sufficient to induce magnetic orientation of one or more molecules present in the process stream relative to the generated magnetic field. In certain embodiments, the exposure time can be an interval between 5 seconds and 90 minutes per 100 gallons of process fluid material; while in other embodiments, it is contemplated that this exposure interval is between 15 seconds and 10 minutes per 100 gallons of process fluid material. Without being bound to any theory, it is believed that the indices molecular orientation can be exhibited in water molecules present in the aqueous carrier itself. In certain embodiments, the contact interval can be between 10 seconds and 30 minutes per 100 gallons of process fluid material; between 20 seconds and 30 minutes per 100 gallons of process fluid material; between 15 seconds and 15 minutes per 100 gallons of process fluid material.

The at least one magnetic field reaction vessel can be configured such that the aqueous process stream that traverses through the vessel will have a residence time sufficient to affect magnetic alignment in the aqueous process stream material. In certain embodiments, it is contemplated that the residence time will be between 15 seconds and 2 hours with residence times between 30 seconds and 1 hour in certain embodiments.

The apparatus also includes at least one charge fluid introduction mechanism that is in fluid communication with the process fluid conduit. In certain embodiments, the charge fluid introduction mechanism in fluid communication with the process fluid conduit can be positioned at a location that is upstream of at least one of the electrolytic reaction vessel and/or the magnetic field reaction vessel. In embodiments of the device as disclosed the charge fluid can contain a compound having the following formula:

wherein x is an odd integer ≥3, y is an integer between 1 and 20 and Z is a polyatomic ion, with Z being at least one of a Group 14 through 17 monoatomic ion having a charge between −1 and −3 and/or a polyatomic ion having a charge between −1 and −3.

The charge fluid conveying conduit can include suitable pumps, sensors, metering devices and the like as desired or required to control the introduction of the charge fluid. The charge fluid conveying conduit can be either permanently or releasably connected to the process fluid conduit at a suitable location. In certain embodiments, the charge fluid conveying conduit can be connected to the process fluid conveying conduit at a location that is up-stream of at least one of the at least one electrolytic reaction vessel, the at least one magnetic field region reaction vessel or both. It is also contemplated that the apparatus can include multiple charge fluid conveying conduits that are positioned at multiple locations along the process fluid conveying conduit.

It is contemplated that the at least one charge fluid conveying conduit, the at least one electrolytic reaction vessel and the at least one magnetic field region reaction vessel can be positioned along the process fluid conduit in any suitable sequence. In certain embodiments, at least one charge fluid conveying conduit will be oriented upstream of the at least one electrolytic reaction vessel and the at least one magnetic field region reaction vessel. The at least one electrolytic reaction vessel and the at least one magnetic field region reaction vessel can be oriented in the process fluid conduit in any order relative to one another. In certain embodiments, at least one electrolytic reaction vessel can be positioned upstream of at the least one magnetic field region reaction vessel.

In certain embodiments, the apparatus can include at least two magnetic field region reaction vessels and at least two one electrolytic reaction vessels that are positioned in fluid contact with the process conduit such that the process stream is conveyed sequentially from residence in an electrolytic reaction vessel into a magnetic field region reaction vessel and from residence in the magnetic field region reaction vessel into a at least one downstream electrolytic reaction vessel and from there into a downstream magnetic field region reaction vessel.

The method as disclosed herein is directed to treating an effluent stream having elevated levels of at least one target contaminant present in an aqueous process stream. The target contaminant can be one or more of the following: metals, heavy metals, sulfates, cyanides hydrocarbons, substituted hydrocarbons and compounds and complexes thereof.

The method as disclosed herein includes the steps of: collecting at least a portion of aqueous process stream, exposing the collected aqueous process stream to a pulsed electric field for an interval between about 15 seconds and about 60 minutes; and exposing the collected fluid to a focused magnetic field, the focused magnetic field having a value between 10 gauss and 1,000,000 gauss, in certain applications.

In certain embodiments, the method is directed to a process or processes for treating a stream of contaminated water having an elevated concentration of at least one target compound component or component. In certain embodiments, the process includes the step of charging the process stream with a quantity of a compound having the following formula:

wherein x is an odd integer ≥3, y is an integer between 1 and 20 and Z is a polyatomic ion, with Z being at least one of a Group 14 through 17 monoatomic ion having a charge between −1 and −3 and/or a polyatomic ion having a charge between −1 and −3. In certain embodiments x is an odd integer between 3-11; y is an integer between 1 and 10; and Z is a polyatomic or monoatomic ion. The polyatomic ion Z can be an ion that is derived from an acid having the ability to donate one or more protons. The associated acid can be one that would have a $pK_a$ values $\geq 1.7$ at 23° C. The polyatomic ion Z employed can be one having a charge of +2 or greater. Non-limiting examples of such polyatomic ions include sulfate ions, carbonate ions, phosphate ions, oxalate ions, chromate ions, dichromate ions, pyrophosphate ions and mixtures thereof. In certain embodiments, it is contemplated that the polyatomic ion can be derived from mixtures that include polyatomic ions that include ions derived from acids having $pK_a$ values $\leq 1.7$.

The process also includes the step of exposing the process stream to a pulsed electric field and to a focused magnetic field having a value between 10 gauss and 1,000,000 gauss. Exposure of the process stream to the pulsed electric field and the focused magnetic field can occur in any order relative to one another. The steps of exposure and charging can occur in any order relative to one another.

The effluent stream that is treated by the method and apparatus as disclosed herein can be an aqueous material derived from various sources. The effluent stream will contain at least one target contaminant. In certain applications, the target contaminant can be at least one of metals, heavy metals, sulfides and chlorides, hydrocarbons, substituted hydrocarbons as well as compounds and complexes thereof. The target contaminant can exist as suspended solids, dispersed solids, dissolved solids and/or mixtures thereof. A used herein the term "heavy metals" is defined as dense metals and metalloids having a specific gravity that is at least five times that of water. Non-limiting examples of such materials include chromium, cobalt, nickel, copper, silver, zinc, cadmium, mercury, thallium, lead, antimony, arsenic, selenium. In other applications such as those associated with metal cleaning, treatment and processing, the target contaminant can be a material such as monovalent transition metals, materials such as aluminum complexes containing selenium, manganese, molybdenum and the like as well as chromium containing materials such as chromium nickel cadmium complexes, mercury containing compounds such as mercury lead compounds, precious metals such as silver and silver complexes, copper and copper containing compounds such as copper-zinc materials. Other target materials generated by industrial processes that can be treated by the process and device as disclosed herein include organic phosphate materials, organic sulfate materials organic nitrate materials, metal carbonates as well as cyanides, both free and complexed. Non-limiting examples of complexed cyanides include nitroprussides and material such as $K_3FeCn_6$.

The pulsed electric field to which the process stream is exposed can be accomplished by exposing the process stream to a pulsed electric field that comprises the step of contacting the process stream with at least one electrode and varying at least one of varying at least one of voltage intensity, voltage delivery duration, electrode polarity in the at least one electrode positioned in the electrolytic reaction vessel. The pulse rate can be between 60 pulses per second and 1 pulse per ten minutes in certain embodiments, with rates between 1 pulse per second and 1 pulse per minute in certain embodiments, and 1 pulse per 5 seconds and 1 pulse per 1 minute in others.

Nonlimiting examples of suitable electrode material include various inert or reactive conductive materials. Nonlimiting examples of inert materials suitable for use as an electrode can include one or more of: carbon, graphite, gold, platinum, rhodium and the like. Non-limiting examples of reactive electrode materials include copper, zinc, lead, silver and the like.

The aqueous process stream can remain in the pulsed electric field for an interval sufficient to permit reaction and generation of hydrogen ion-water complexes. In certain embodiments, this interval can be between 2 seconds and 90 minutes per 100 gallons of process fluid material. In certain embodiments, the interval can be between 5 seconds and 60 minutes per 100 gallons of process fluid material. In certain embodiments, the contact interval can be between 10 seconds and 30 minutes per 100 gallons of process fluid material; between 20 seconds and 30 minutes per 100 gallons of process fluid material; between 15 seconds and 15 minutes per 100 gallons of process fluid material.

The process as disclosed herein also include the step of exposing the aqueous process stream to a generated magnetic field of between 10 gauss and 2,000,000 gauss. In certain embodiments, the magnetic field will be between 5000 and 1,000,000 gauss in certain applications and between 5000 and 100,000 gauss. It is to be understood that in certain applications, the magnetic field can be between 10 and 10,000 gauss. The process fluid can be exposed to the generated magnetic field for an interval sufficient to induce magnetic orientation of one or more molecules present in the process stream relative to the generated field. Without being bound to any theory, it is believed that exposure to the generated magnetic field, particularly when such exposure occurs after the exposure to the pulsed electric field, induces orientation of the hydration cages previously generated in the process fluid stream due to exposure to the pulsed electric field. In such embodiments, it is contemplated that the interval between exposure to the pulsed electric field and the generated magnetic field will be one sufficient to maximize the concentration of hydration cages present in the process stream. In certain embodiments, this interval will be less than one minute, while in others, the interval will be between 30 seconds and 3 hours.

The interval during which the process fluid is exposed to the generated magnetic field will be between 5 seconds and 90 minutes per 100 gallons of process fluid material in certain embodiments. In certain embodiments, the contact interval can be between 10 seconds and 30 minutes per 100 gallons of process fluid material; between 20 seconds and 30 minutes per 100 gallons of process fluid material; between 15 seconds and 15 minutes per 100 gallons of process fluid material.

The step of charging the process stream with a quantity of a compound having the following formula:

$$\left[ H_xO_{\frac{(x-1)}{2}} + (H_2O)_y \right] Z$$

wherein x is an odd integer $\geq 3$, y is an integer between 1 and 20 and Z is a polyatomic ion, with Z being at least one of a Group 14 through 17 monoatomic ion having a charge between $-1$ and $-3$ and/or a polyatomic ion having a charge between $-1$ and $-3$ can occur at any point in the aforementioned process. In certain embodiments, it is contemplated that x is an integer between 3 and 12, while in others, it is contemplated that x is an integer between 3 and 9. In certain embodiments, it is contemplated that y is an integer between 1 and 5. Suitable material can be prepared by the steps outlined in US Application Number 2016-031209, the contents of which are incorporated herein. In certain embodiments, the compound can be selected from the group consisting of hydrogen (1+), triaqua-µ3-oxotri sulfate (1:1); hydrogen (1+), triaqua-µ3-oxotri carbonate (1:1), hydrogen (1+), triaqua-µ3-oxotri phosphate, (1:1); hydrogen (1+), triaqua-µ3-oxotri oxalate (1:1); hydrogen (1+), triaqua-µ3-oxotri chromate (1:1) hydrogen (1+), triaqua-µ3-oxotri dichromate (1:1), hydrogen (1+), triaqua-µ3-oxotri pyrophosphate (1:1), and mixtures thereof. It has been found, quite unexpectedly, that the hydronium ion complexes present in solution as a result of the addition of the stable electrolyte material disclosed herein alter the acid functionality of the resulting solvent material without a concomitant change in the free acid to total acid ratio. The alteration in acid functionality can include characteristics such as change in measured pH, changes in free-to-total acid ratio, changes in specific gravity and rheology. Changes in spectral output and chromatography output are also noted as compared to the incumbent acid materials used in production of the stable electrolyte material containing the initial hydronium ion complex. Addition of the stable electrolyte material as disclosed herein results in changes in $pK_a$ which do not correlate to the changes observed in free-to-total acid ratio. In such structures, an core is protonated by multiple $H_2O$ molecules. It is contemplated that the hydronium complexes present in the composition of matter as disclosed herein can exist as Eigen complex cations, Zundel complex cations or mixtures of the two. The Eigen solvation structure can have the hydronium ion at the center of an $H_9O_4+$ structure with the hydronium complex being strongly bonded to three neighboring water molecules. The Zundel solvation complex can be an $H_5O_2+$ complex in which the proton is shared equally by two water molecules. The solvation complexes typically exist in equilibrium between Eigen solvation structure and Zundel solvation structure. Heretofore, the respective solvation structure complexes generally existed in an equilibrium state that favors the Zundel solvation structure. The present disclosure is based, at least in part, on the unexpected discovery that stable materials can be produced in which hydronium ion exists in an equilibrium state that favors the Eigen complex. The present disclosure is also predicated on the unexpected discovery that increases in the concentration of the Eigen complex in a process stream can provide a class of novel enhanced oxygen-donor oxonium materials.

In certain embodiments, the charging step well occur prior to the exposure to the pulsed electric field and/or the generated magnetic field. It is also within the purview of this disclosure that the charging step occur at intervals before, between and/or during these steps. The compound can be present in an aqueous composition at a concentration between 100 ppm and 1,000,000 ppm in the resulting charged aqueous process fluid in certain embodiments. Where the compound is added in divided dose through the process, it is contempered that the charged aqueous process fluid can exhibit a concentration between 100 ppm to 1,000,000 ppm after each charge addition.

Without being bound to any theory, it is believed that the presence of the charging compound in the aqueous process stream during one or both of the electric field exposure step and/or the exposure to the focused generated magnetic field contributes to the production of hydration cages in the aqueous process stream. Additionally, it is believed that the presence of the charging compound produces an aqueous process fluid having elevated levels of available reactive molecular hydrogen which in turn reacts with at least one target contaminant both during the aforementioned steps and during downstream processing to produce compounds and chemical complexes that can be removed during clarification and separation steps.

It is contemplated that the method and process as disclosed herein can be used on its own or in combination with various other remediation and treatment operations to produce remediated water with reduced levels of target material. The produced material may be appropriate for discharge into streams or waterways in certain applications. In other operation, the water produced may be amenable for subsequent treatment or processing.

It is also contemplated that the process and apparatus as defined herein can be used to treat and remediate aqueous process streams generated from one or more municipal or consumer generated processes, for example textile washing, laundry and light cleaning operations as well cleaning processes associated with operations such as washing vehicles et cetera, to produce potable and recycled water.

The resulting process water produced by the process and device as disclosed herein have reduced levels of contamination sufficient to permit recycle and reuse closed loop industrial processing systems and even use in use in non-agricultural irrigation applications to support non-food plant growth. In certain applications, based factors including, but not limited to, original contamination levels and/or the level of processing intensity, the resulting aqueous stream can be suitable for use in applications such as range grass watering for animal feed and the like. In certain applications, the resulting aqueous material can be used for non-consumption human contact and even as potable drinking water in certain applications.

Figure 1:
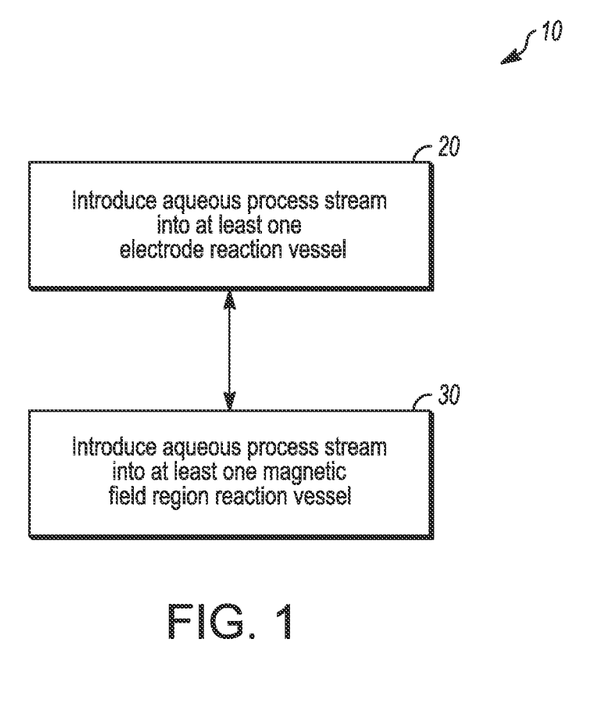
FIG. 1 is a diagram of an embodiment of an apparatus for treating a process stream having at least one target contaminant.

An embodiment of the process 10 for treating and remediating water as disclosed herein is depicted in FIG. 1. The process as broadly construed is directed to exposing a process stream having at least one target contaminant to an electrolytic reaction environment and exposing the process stream to a magnetic field. These exposures can occur sequentially in either order or iteratively in either order and can proceed in whole or in part simultaneously in certain instances. As depicted in FIG. 1, the process 10 includes a step in which the process stream having at least one target contaminant entrained therein into an electrode reaction vessel as at reference numeral 20. The aqueous stream can remain in the in the electrode reaction vessel for an interval sufficient to permit reaction and generation of hydrogen ion-water complexes.

The process 10 also includes the step introducing the aqueous process stream into at least one magnetic field region reaction vessel as at reference numeral 30. The aqueous process stream can reside in the reaction vessel for an interval sufficient to affect the magnetic alignment in the aqueous process stream material. The steps outlined at reference numerals 20 and 30 can be repeated iteratively or sequentially as desired or required.

Where desired or required process can also include the charging with suitable base additives including but not limited to suitable stable hydronium type additive materials as desired or required. In certain embodiments, the stable base hydronium type additive materials can include one or more of the following:

a composition of matter having the following chemical structure:

where x is an integer greater than 3;
where y is an integer less than x;
where m is an integer between 1 and 6;
where n is an integer between 1 and 3; and
where Z is a monoatomic cation, polyatomic cation or cationic complex.

In certain embodiments, the stable base hydronium complex will be added after the steps of exposing the aqueous process stream to the pulsed electric field and the focused magnetic field and in certain embodiments can occur after removal of generated compounds such as sulfate solids. In certain embodiments, the stable hydronium compound can be added to provide a solution concentration between 10 ppm and 50,000 ppm. In certain embodiments, the stable hydronium additive will have the aforementioned formula in which Z is one of a monoatomic cation, a polyatomic ion or a cationic complex having a charge of +2 or greater in which at least a portion of the second compound is present as at least one of $H_4O_3^{2-}$, $H_5O_2^{2-}$, $H_7O_2^{2-}$, $H_6O_5^{2-}$ and mixtures thereof in coordinated combination with working bridging ligands containing stable hydroxonium anion clusters in aqueous solution. Non-limiting examples of such material are outlined in US Application Number 2016-034019, the disclosure of which is incorporated herein by reference.

Figure 2:
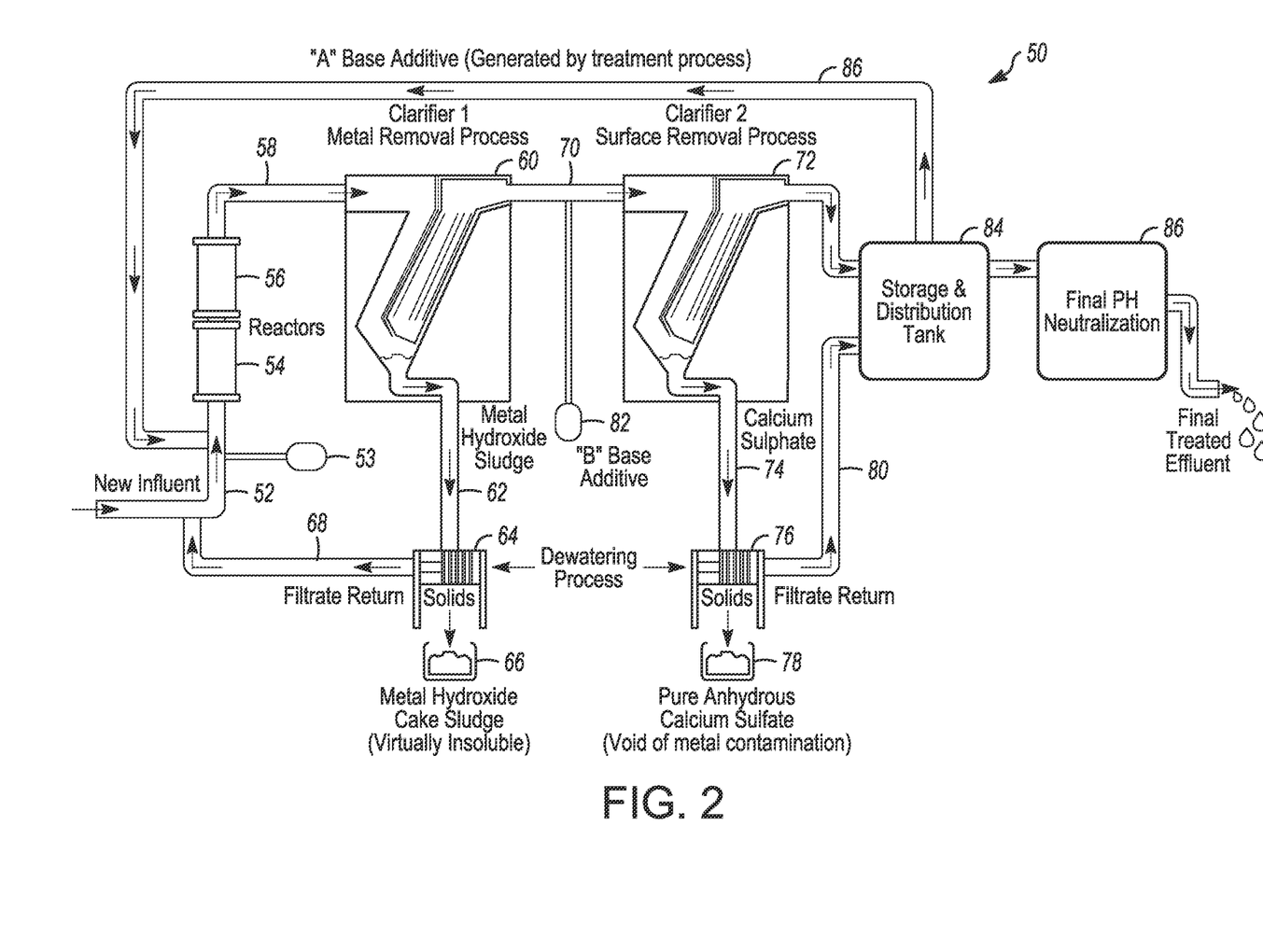
FIG. 2 is a process diagram outlining an embodiment of-processes associated with further treatment of the aqueous material produced in the method outlined in FIG. 1.

Referring now to the apparatus depicted in FIG. 2 there is illustrated a remediation system configured for addressing heavily contaminated aqueous streams as may be generated by industrial manufacturing processes, mining operations and the like. The apparatus 50 includes at least one aqueous process fluid inlet 52 configured to convey the aqueous process fluid to be treated from an exterior source into the apparatus 50.

The apparatus 50 also includes at least one electrolytic reaction vessel 54 that is configured to introduce a charge into the aqueous stream and induce a charged state in the aqueous material. The apparatus 50 also includes at least one magnetic field region reaction vessel 56 that is configured to expose the process fluid to a non-polar magnetic field that is sufficient to orient water molecules present in the aqueous process fluid. As depicted, the magnetic field region reaction vessel 56 is positioned downstream of the electrolytic reaction vessel 54. It is within the purview of this disclosure that the order of the respective vessels 54, 56 be switched. As depicted, the respective reaction vessels 54, 56 are configured for single-pass processing, however, it is also within the purview of this disclosure that the apparatus 50 can be configured to permit iterative recirculation though one or both of the reaction vessels 54, 56. It is also with in the purview of this disclosure that the apparatus 50 include more the one of either vessel. Where multiple vessels are employed, the various vessels can be oriented in parallel, in series or in various configuration utilizing both orientations as desired or required.

The apparatus also includes at least one charge fluid introduction device 53 in fluid communication with the conduit 52.

Once processed, the treated aqueous process stream can be conveyed through a suitable transit pipe into at least one clarifier unit. In the embodiment depicted, the apparatus 50 includes a metal clarifier unit 60 that is configured to trigger precipitation of metals entrained in the process stream as metal hydroxide sludge. The metal hydroxide sludge can be conveyed out of the metal clarifier unit 60 by a suitable conduit such as conduit 62 for further processing and for environmentally safe disposal.

In the apparatus depicted in FIG. 1, metal hydroxide sludge is conveyed to a dewatering unit 64 to separate solid material from the associated water by suitable processes such as gravity, pressure, centrifugation or the like. The resulting solid material that is generated is in the form a metal hydroxide cake sludge 66 that can be recycled, processed or transferred for disposal in an environmentally suitable manner. The water separated during this operation can be conveyed away from the dewatering unit 64 by any suitable means such as conduit 68. In the apparatus 50 as depicted, conduit 68 is in fluid connection with the inlet conduit 52 at a location upstream of one or more of the reactor units 54, 56. As desired, the separated aqueous material can be reintroduced in the aqueous process stream in a suitable manner. In certain applications, the separated process water can be metered into the process stream in the inlet conduit 52 in a manner that permits controlled dilution of the process stream. The conduit 68 can be equipped with appropriate meters etc. (not shown).

The clarified process fluid can exit the metal clarifier unit 60 via a suitable conduit such as conduit 70. In the embodiment depicted in FIG. 2, the aqueous process stream can be introduced into a sulfate removal clarifier 72 that is configured to generate sulfate and a insoluble calcium sulfate that can be removed via a suitable conduit 74 to be conveyed to the a suitable dewatering unit 76 to produce solid material in the form of pure anhydrous calcium sulfate 78 that can be removed for suitable post process applications. The aqueous filtrate produced in the dewatering process can be conveyed form the dewatering unit 76 by a suitable conduit 80.

To facilitate calcium sulfate formation, the apparatus can include a suitable means for acidifying the process stream. In the apparatus 50 can include a suitable acidification reservoir 82 that is in fluid communication with the process stream at a location downstream of the metal clarifier unit 60. In the embodiment depicted, the acidification unit 82 is connected to the process stream at a location in the conduit 70 and can include suitable meters, feedback sensors and the like.

In certain embodiments, the acidification reservoir 82 can be configured to permit the process fluid to be admixed with volumes of an aqueous material that includes a compound having the general formula:

wherein x is an odd integer ≥3, with x being an integer between 3 and 12 in certain embodiments and between 3 and 9 in certain embodiments;
y is an integer between 1 and 20, with y being an integer between 1 and 5 in certain embodiments; and
Z is a polyatomic ion, with Z being one of a group 14 through 17 monoatomic ion having a charge between −1 and −3 or a poly atomic ion having a charge between −1 and −3

The clarified process stream that exits the clarification unit 72 into a suitable conduit 82 that communicates with a suitable storage and distribution tank 84. It is contemplated that a portion of the process fluid accumulated in the storage and distribution tank 84 can be removed into conduit 86 where it can be reintroduced into the initial process stream to achieve dilution and priming prior to entry into the reactors 54, 56. The balance of the processed material can be conveyed into the suitable pH neutralization tank 86 where the process stream can be neutralized as required and the material can be released as final treated effluent.

Without being bound to any theory, it is believed that the process and apparatus disclosed herein serves to break the chemical bonds between contaminants and water molecules by changing their valence state, which allow metals to precipitate out of solution, forming insoluble metal precipitants producing a treated effluent at between 6 and 10 pH. This process is capable of treating water to State and Federal discharge standards, producing relatively small amounts of metal cake material, and is accomplished without generating large quantities of sludge. The system has a simple design and a relatively small footprint, fail safe monitoring technology, minimal electrical requirements, minimal maintenance and operational costs, high throughput, and is capable of continuous operation.

It is believed that the system functions with minimal amounts of non-hazardous, non-toxic, non-corrosive, proprietary chemistries compared to conventional hazardous slack lime. Minimal amounts of non-hazardous, food grade, GRAS-rated lime slurry are employed compared to conventional hazardous slack lime with up to 50% decrease in sludge production; producing a sludge that is free of heavy metals and other desirable material as well as production of material such as reclaimable metal and materials such as calcium sulfate for use in post-process industrial procedures such as the manufacture of metal free gypsum.

In order to further illustrate the present disclosure, reference is made to the following non-limiting examples.

Example I

The process and an embodiment of the apparatus as disclosed herein is employed on two samples taken from Cement Creek Colorado. After treatment, levels of key metals were determined. The results are summarized in TABLE I.

TABLE 1

| Contaminant mg | Sample 1 | Sample 2 | Treated 1 | Treated 2 | Federal drinking water standards |
|---|---|---|---|---|---|
| Aluminum | 11 | 11 | ND | 0.23 | N/A |
| Cadmium | 0.031 | 0.032 | ND | ND | 0.005 |
| Copper | 1.6 | 1.6 | 0.055 | 0.035 | 1.3 |
| Iron | 23 | 21 | 1.8 | 1.6 | N/A |
| Manganese | 18 | 18 | 11 | 7.9 | N/A |
| Lead | 0.043 | 0.035 | ND | ND | 0 |
| Zinc | 12 | 11 | 0.27 | ND | 5 |

Example II

Effluent from a chemical processing and surface engineering company was treated according to the process as disclosed herein. The effluent included cadmium, nickel copper, gold, silver zinc, mercury and lead as well as inorganic ligands that were treated and included free and total cyanide, phosphates, and fluoride compounds. Organics included methyl ethyl ketone, acetone, and trichloroethylene. The process was evaluated against incumbent treatment systems in place in the installation. It was found that the water discharged after treatment according to the process outlined in the present disclosure had a water quality similar to distilled water and was able to meet the requirement for total toxic organics. This was achieved with a 90% reduction in solid waste generated with treatment proceeding without reactivity, outgassing or exothermicity.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for treating a stream of contaminated water having an elevated concentration of at least one target chemical component, the apparatus comprising:
   at least one process fluid inlet communicating with a process fluid conduit, the process fluid inlet in at least temporary fluid communication with a source of contaminated water having an elevated concentration of at least one target chemical component, the target chemical component selected from the group consisting of light metals, heavy metals, sulfates, hydrocarbons and mixtures thereof;
   at least one charging inlet, the charging inlet configured to convey a metered quantity of an aqueous composition comprising a compound having the following formula:

wherein x is and odd integer ≥3, y is an integer between 1 and 20 and Z is a polyatomic ion, with Z being at least one of a Group 14 through 17 monoatomic ion having a charge between −1 and −3 and/or a polyatomic ion having a charge between −1 and −3;
   at least one electrolytic reaction vessel in fluid communication with the process fluid conduit, the electrolytic reaction vessel having an interior chamber and at least one electrode positioned in the interior chamber of the reaction vessel, wherein the at least one electrode operates in either a pulsed or intermittent alternate manner;
   at least one magnetic field region reaction vessel, the magnetic field reaction vessel being in fluid communication with the process fluid conduit, the magnetic field reaction vessel having an outwardly oriented surface and an opposed inwardly oriented surface, the magnetic field reaction vessel having at least one magnet in contact with the inwardly oriented surface of the magnetic field reaction vessel;
   at least one separation device located downstream of the at least one electrolytic reaction vessel and the at least one magnetic field region reaction vessel.

2. The apparatus of claim 1 further comprising at least one electrode power regulation mechanism, the electrode power regulation mechanism configured to vary at least one of voltage intensity, voltage delivery duration, electrode polarity in the at least one electrode positioned in the electrode reaction vessel.

3. The apparatus of claim 2 wherein the magnetic field reaction vessel is configured to expose the aqueous process stream to a focused magnetic field having a value between 10 gauss and 100,000 gauss.

4. The apparatus of claim 1 wherein the separation device is at least one of a filtration unit, a centrifuge and/or a compressor.

5. The apparatus of claim 1 comprising:
at least one electrode power regulation mechanism, the electrode power regulation mechanism configured to vary at least one of voltage intensity, voltage delivery duration, electrode polarity in the at least one electrode positioned in the electrode reaction vessel; and at least one controller configured monitor characteristic of the process fluid, wherein the magnetic field reaction vessel is configured to expose the aqueous process stream to a focused magnetic field having a value between 10 gauss and 100,000 gauss.

6. A method for reducing concentration of at least one target contaminant in an aqueous process stream, the method comprising the steps of:
introducing the aqueous process stream into an apparatus composed of:
at least one charging inlet, the charging inlet configured to convey a metered quantity of an aqueous composition; at least one electrolytic reaction vessel in fluid communication with the process fluid conduit, the electrolytic reaction vessel having an interior chamber and at least one electrode positioned in the interior chamber of the reaction vessel, wherein the at least one electrode operates in either a pulsed or intermittent alternate manner;
at least one magnetic field region reaction vessel, the magnetic field reaction vessel being in fluid communication with the process fluid conduit, the magnetic field reaction vessel having an outwardly oriented surface and an opposed inwardly oriented surface, the magnetic field reaction vessel having at least one magnet in contact with the inwardly oriented surface of the magnetic field reaction vessel; and
at least one separation device located downstream of the at least one electrolytic reaction vessel and the at least one magnetic field region reaction vessel;
charging the process stream with a quantity of the aqueous composition comprising a compound having the following formula:

wherein x is and odd integer ≥3, y is an integer between 1 and 20 and Z is a polyatomic ion, with Z being at least one of a Group 14 through 17 monoatomic ion having a charge between −1 and −3 and/or a polyatomic ion having a charge between −1 and −3; and
at least one of the following steps:
a) exposing the process stream to a pulsed electric field;
b) exposing the process stream to a focused magnetic field having a value between 10 gauss and 1,000,000 gauss.

7. The method of claim 6 wherein the process comprises the steps sequentially:
charging the process stream with the quantity of a compound having the following formula:

exposing the aqueous process stream to the pulsed electric field;
exposing the aqueous process stream to the focused magnetic field having a value between 10 gauss and 100,000 gauss.

8. The method of claim 7 wherein the target contaminant is at least one of metals, heavy metals, sulfides and chlorides, hydrocarbons, substituted hydrocarbons as well as compounds and complexes thereof.

9. The method of claim 7 wherein the step of exposing the process stream to a pulsed electric field comprises the step of contacting the process stream with the at least one electrode and varying at least one of varying at least one of voltage intensity, voltage delivery duration, electrode polarity in the at least one electrode positioned in the electrolytic reaction vessel.

10. The method of claim 9 wherein the process stream is exposed to the pulsed electric field for an interval between 2 second and 90 minutes and where in the pulsing is do at least in part to varying electrode polarity.

11. The method of claim 6 wherein the charging compound is selected from the group consisting of hydrogen (1+) triaqua-μ3-oxotri sulfate, hydrogen (1+) triaqua-μ3-oxotri carbonate, hydrogen (1+) triaqua-μ3-oxotri phosphate, hydrogen (1+) triaqua-μ3-oxotri oxalate, hydrogen (1+) triaqua-μ3-oxotri chromate, hydrogen (1+) triaqua-μ3-oxotri dichromate, hydrogen (1+) triaqua-μ3-oxotri pyrophosphate, and mixtures thereof.

12. The method of claim 11 further comprising the step of charging the process stream with a composition having the following chemical structure:

where x is an integer greater than 3;
y is an integer less than x;
m is an integer between 1 and 6;
n is an integer between 1 and 3; and
Z is a monoatomic cation, polyatomic cation or cationic complex.

13. The method of claim 6 wherein the step of exposing the process stream to a puled electric stream occurs in the at least one electrolytic reaction vessel, and wherein the step of exposing the process stream to a focused magnetic field occurs in the at least one magnetic field region reaction vessel.

14. The method of claim 13 wherein the target contaminant is at least one of metals, heavy metals, sulfides and chlorides, hydrocarbons, substituted hydrocarbons as well as compounds and complexes thereof.

15. The method of claim 14 wherein the step of exposing the process stream to a pulsed electric field comprises the step of contacting the process stream with the at least one electrode and varying at least one of varying at least one of voltage intensity, voltage delivery duration, electrode polarity in the at least one electrode positioned in the electrolytic reaction vessel.

16. The method of claim 15 wherein the process stream is exposed to the pulsed electric field for an interval between 2 second and 90 minutes and where in the pulsing is do at least in part to varying electrode polarity.

* * * * *